(12) United States Patent
Murao et al.

(10) Patent No.: US 7,923,969 B2
(45) Date of Patent: Apr. 12, 2011

(54) STATE OF CHARGE EQUALIZING DEVICE AND ASSEMBLED BATTERY SYSTEM INCLUDING SAME

(75) Inventors: Hiroya Murao, Moriguchi (JP); Mika Kirimoto, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 273 days.

(21) Appl. No.: 12/342,832

(22) Filed: Dec. 23, 2008

(65) Prior Publication Data

US 2009/0167248 A1    Jul. 2, 2009

(30) Foreign Application Priority Data

Dec. 27, 2007  (JP) ................................. 2007-338171

(51) Int. Cl.
- *H02J 7/00* (2006.01)
- *G01N 27/416* (2006.01)
- *G08B 21/00* (2006.01)
- *H02J 7/34* (2006.01)

(52) U.S. Cl. ........ 320/134; 320/149; 320/154; 324/429; 324/434; 324/522; 340/636.12; 340/636.15; 340/636.17; 340/636.2; 307/49; 307/54

(58) Field of Classification Search .................... 320/134
See application file for complete search history.

(56) References Cited

U.S. PATENT DOCUMENTS

| | | | |
|---|---|---|---|
| 5,504,415 A * | 4/1996 | Podrazhansky et al. ....... | 320/118 |
| 5,528,122 A * | 6/1996 | Sullivan et al. ............... | 320/118 |
| 5,990,663 A * | 11/1999 | Mukainakano ................ | 320/134 |
| 6,396,246 B2 * | 5/2002 | Haraguchi et al. ............ | 320/134 |
| 6,489,749 B1 * | 12/2002 | Nakashimo et al. .......... | 320/134 |
| 2003/0232237 A1 | 12/2003 | Nakagawa et al. | |
| 2004/0135546 A1 * | 7/2004 | Chertok et al. ............... | 320/118 |
| 2006/0273802 A1 * | 12/2006 | Murakami et al. ............ | 324/434 |
| 2009/0039830 A1 | 2/2009 | Pellenc | |

FOREIGN PATENT DOCUMENTS

| | | |
|---|---|---|
| EP | 0 814 556 A2 | 12/1997 |
| EP | 2 249 453 A1 | 11/2010 |
| FR | 2 862 813 A1 | 5/2005 |
| JP | 8-19188 A | 1/1996 |
| JP | 11-234917 A | 8/1999 |
| JP | 2001-218376 A | 8/2001 |
| JP | 2001-231178 A | 8/2001 |
| WO | 99/05767 A1 | 2/1999 |

OTHER PUBLICATIONS

European Search Report issued on Jan. 4, 2011 in the corresponding to European Patent Application No. 08254080.6.

* cited by examiner

*Primary Examiner* — Edward Tso
*Assistant Examiner* — Yalkew Fantu
(74) *Attorney, Agent, or Firm* — NDQ&M Watchstone LLP (57) ABSTRACT

A state-of-charge equalizing device equalizes the state of charge of each of cells connected in series to form an assembled battery, and comprises charging/discharging circuits connected in parallel to the respective cells to discharge and/or charge the respective cells, voltage measurement circuits connected to the respective charging/discharging circuits to measure the voltages across the respective cells, and a control circuit. The control circuit comprises a unit calculating an equalization target voltage based on the measured voltages before the charge or discharge starts, a unit starting discharging/charging the cells having a voltage thereacross different from the target voltage, a unit correcting the target voltage to thereby calculate a corrected equalization target voltage for each of those cells based on the difference between the measured voltages before and at a certain time period after the charging/discharging, and a unit ending the discharging/charging when the measured voltage reaches the corrected target voltage.

5 Claims, 10 Drawing Sheets

STATE OF CHARGE EQUALIZING DEVICE AND ASSEMBLED BATTERY SYSTEM INCLUDING SAME

The Japanese application Number 2007-338171, upon which this patent application is based, is hereby incorporated by reference.

BACKGROUND OF THE INVENTION

1. Field of the Invention

The present invention relates to devices equalizing the states of charge of a plurality of cells that form an assembled battery, and assembled battery systems including the devices.

2. Description of Related Art

In recent years, an assembled battery has been widely used, for example an assembled battery including a plurality of lithium-ion secondary cells connected in series is used in a hybrid vehicle as a power source. Discharge power of an assembled battery is limited by a cell with the lowest state of charge (SOC) among a plurality of cells that form the assembled battery. Therefore, performance of the assembled battery decreases due to the variation of SOC of the plurality of cells that form the assembled battery. Accordingly, an equalization process is required to limit the variety of the SOCs of the plurality of cells that form an assembled battery within a certain range.

Figure 9:
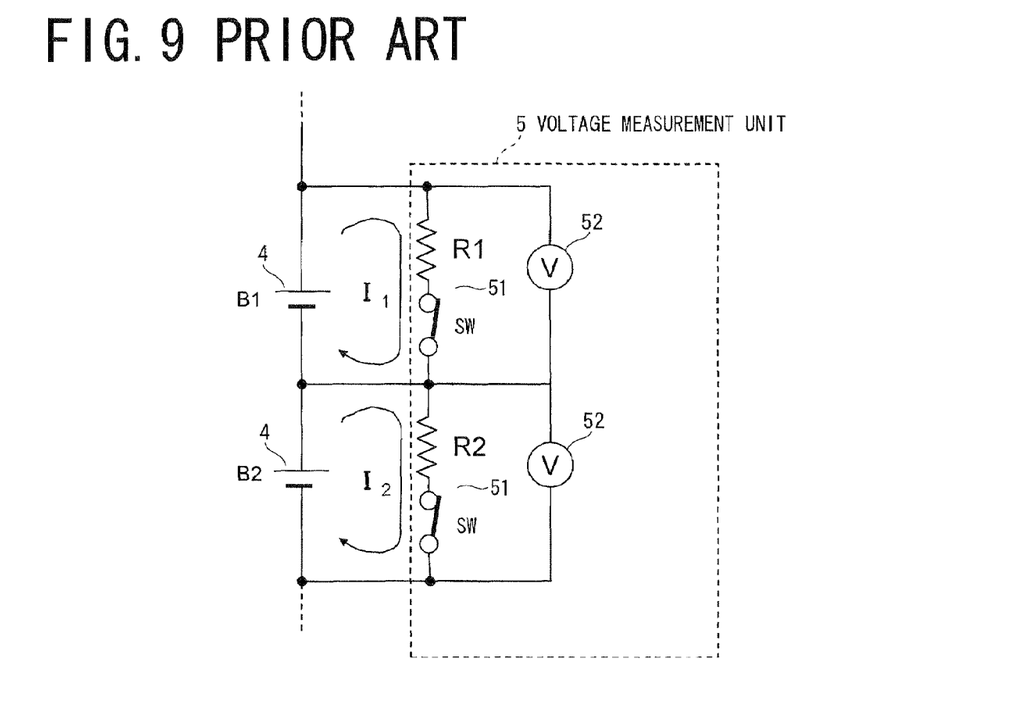
FIG. 9 is a circuit diagram illustrating a main part of a conventional state of charge equalizing device.

FIG. 9 shows a main part of a conventional state of charge equalizing device. A discharge circuit 51 comprising a resistor R and a switch SW connected in series is connected to both ends of each cell 4 that forms an assembled battery in parallel with respect to each cell. A voltage measurement circuit 52 which measures the voltage between both ends of each cell 4 (open-circuit voltage) is connected to both ends of each discharge circuit 51. Here, a plurality of discharge circuits 51 and a plurality of voltage measurement circuits 52 are mounted on one substrate, thereby configuring a voltage measurement unit 5.

In this state of charge equalizing device, the open-circuit voltage of each cell 4 is measured by each voltage measurement circuit 52, and an equalization target voltage is calculated based on the measured cell voltage. For example, the equalization target voltage is calculated by adding a predetermined value to the lowest value or an average value of the measured cell voltages. Thereafter, the discharge circuit 51 starts discharging each cell which has the open-circuit voltage higher than the equalization target voltage, and then the discharge circuit 51 stops discharging when the voltage measured by the voltage measurement circuit 52 reaches the equalization target voltage. Thus the SOCs of the plurality of cells that form the assembled battery are equalized.

However, in the conventional state of charge equalizing device described above, since the voltage measurement circuit 52 is connected to both ends of the discharge circuit 51 as shown in the figure, when each cell 4 is discharged, discharge current $I_1$ and discharge current $I_2$ flow in each discharging loop including the cell 4 and the discharge circuit 51 as shown by arrows in the figure, thereby causing a great voltage drop due to an internal resistance of the cell 4, a resistance component of and contact resistance between terminals existing between a cell terminal and a voltage detecting point, and a resistance component of a voltage detecting wire extending from the cell terminal to the voltage detecting point. As a result, the voltage measured by the voltage measurement circuit 52 becomes lower than the actual voltage.

Figure 10:
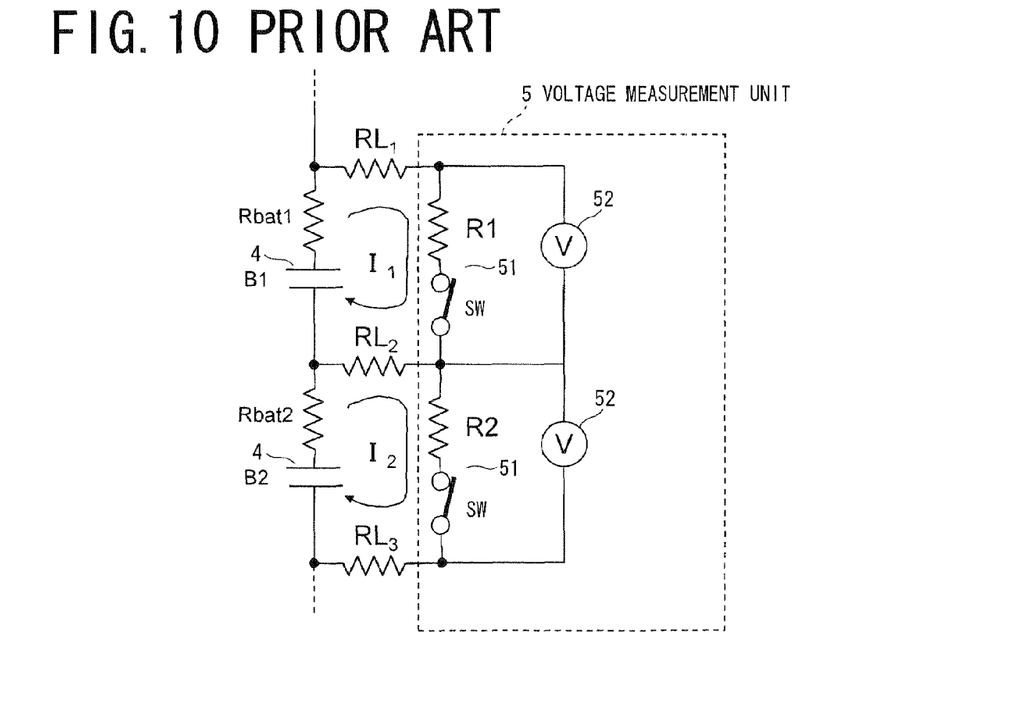
FIG. 10 is a circuit diagram for explaining a conventional problem.

As shown in FIG. 10, when the voltage of a cell B1 is V, the discharge current flowing in the discharging loop including the cell B1 and the discharge circuit 51 is $I_1$, the internal resistance of the cell B1 is Rbat1, and the resistance component of the terminal, the contact resistance between terminals and the resistance component of the voltage detecting wire are $RL_1$, a voltage VB1 which is measured by the voltage measurement circuit 52 connected to the cell B1 is described by a formula 1 below.

$$VB1 = V - I_1(Rbat1 + RL_1) \qquad \text{Formula 1}$$

Figure 11:
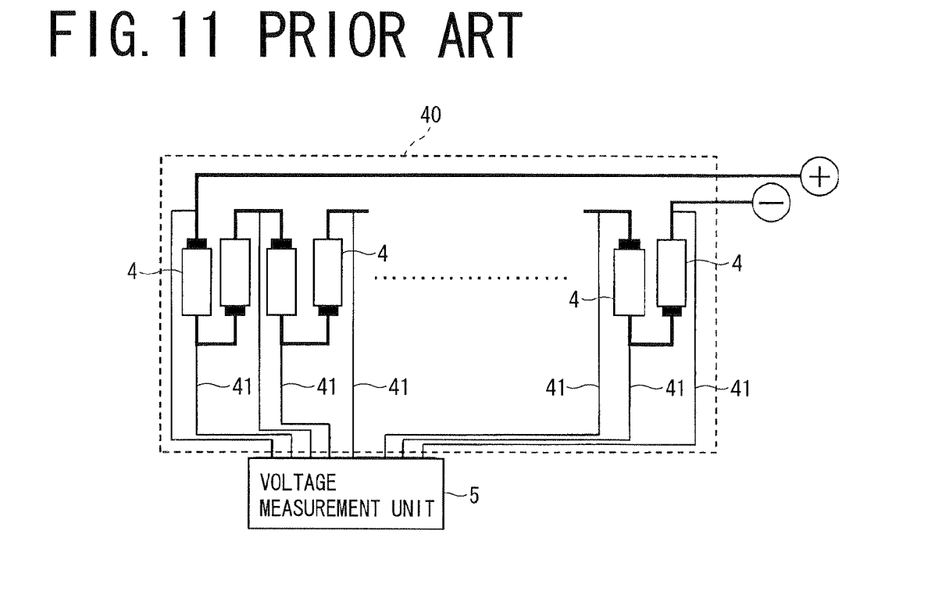
FIG. 11 illustrates a configuration of an assembled battery.

Since the voltage measured by the voltage measurement circuit 52 is lower than the actual voltage as described above, even if the discharging of the cell 4 is ended at the time the voltage measured by the voltage measurement circuit 52 reaches the equalization target voltage, the actual cell voltage is higher than the equalization target voltage. Also, as shown in FIG. 11, since the length of a voltage detecting wire 41 extending from the plurality of cells 4 that form the assembled battery to a voltage measurement unit 5 varies from a cell to another, the amount of voltage drop due to the resistance component of the voltage detecting wire 41 varies from a cell to another. Thus, the difference between the voltage measured by the voltage measurement circuit and the actual cell voltage varies from a cell to another. Therefore, after the equalization process, the amount of actual cell voltage exceeding the equalization target voltage varies from a cell to another, thereby causing a problem of not being able to achieve high accuracy in the equalization process.

Figure 12:
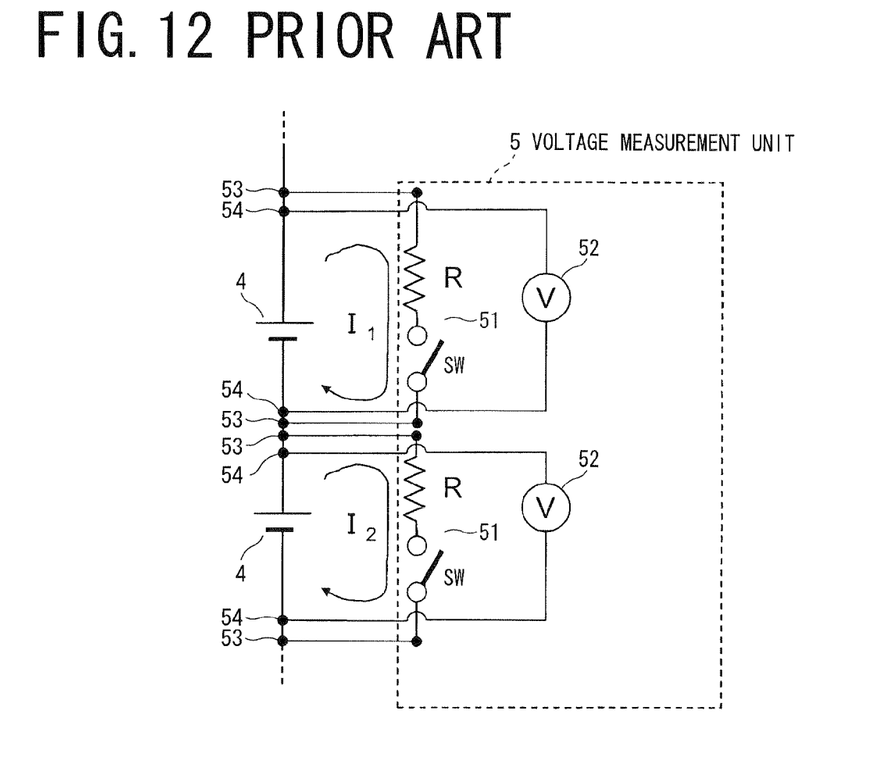
FIG. 12 is a circuit diagram illustrating a modification of the conventional state of charge equalizing device.

To solve this problem, it is possible to adopt a structure as shown in FIG. 12, in which terminals 54, 54 for connecting the voltage measurement circuit 52 to both ends of the cell 4 are provided separately from terminals 53, 53 for connecting the discharge circuit 51 to both ends of the cell 4, and the voltage measurement circuit 52 is connected to the terminals 54, 54. According to this structure, it is possible to reduce the amount of voltage drop due to the resistance component of and contact resistance between the terminals existing between the cell terminal and the voltage detecting point, and the resistance component of the voltage detecting wire extending from the cell terminal to the voltage detecting point.

Also, there has been proposed a method of calculating the amount of voltage drop due to the internal resistance of the cell and correcting the equalization target voltage based on the calculated amount of voltage drop.

However, in the structure in which the voltage measurement circuit 52 is connected to both ends of the cell 4 as shown in FIG. 12, the number of terminals connecting to both ends of the cell and the number of connecting wires extending from the cell 4 to the voltage measurement unit 5 double, thereby causing a problem of making the structure complicated and increasing the manufacturing cost. In addition, in the structure described above, even though the amount of voltage drop due to the resistance component of the terminal, the contact resistance between the terminals and the resistance component of the voltage detecting wire reduces, the amount of voltage drop due to the internal resistance of the cell 4 is still large, thereby causing a problem of not being able to perform the equalization process with high accuracy.

Also in the conventional method of calculating the amount of voltage drop due to the internal resistance of the cell and correcting the equalization target voltage based on the calculated amount of voltage drop, there is a problem of not being able to perform the equalization process with high accuracy. This is because the voltage drop, which is the cause of the difference between the actual cell voltage and the voltage measured by the voltage measurement circuit, includes not only the voltage drop due to the internal resistance of the cell, but also the one due to the resistance component of the terminal, the contact resistance between the terminals and the resistance component of the voltage detecting wire as described above, and therefore the correction of the equalization target voltage based on the voltage drop due to the internal resistance of the cell is inadequate.

SUMMARY OF THE INVENTION

Therefore, an object of the present invention is to provide a state of charge equalizing device and an assembled battery system including the device capable of the equalization process with higher accuracy than in a conventional device without changing its circuit configuration.

A state of charge equalizing device according to the present invention is a device equalizing the state of charge of each of a plurality of cells connected in series to form an assembled battery, comprising a plurality of charging/discharging circuits connected in parallel to the respective cells to discharge and/or charge the respective cells, a plurality of voltage measurement circuits connected to the respective charging/discharging circuits to measure the voltages across the respective cells, and a control circuit controlling an operation of each of the charging/discharging circuits based on the measurement result of each of the voltage measurement circuits. The control circuit comprises:

an equalization target voltage calculating unit calculating an equalization target voltage based on the voltages measured by the plurality of voltage measurement circuits before the plurality of charging/discharging circuits start discharging or charging;

a charging/discharging starting unit that starts discharging or charging the cells each having a voltage thereacross different from the equalization target voltage calculated by the equalization target voltage calculating unit, by means of the respective charging/discharging circuits;

a correcting unit correcting the equalization target voltage to thereby calculate a corrected equalization target voltage for each of said cells, based on the difference between the voltage measured by the voltage measurement circuit before the charging/discharging circuit starts discharging or charging the cell and the voltage measured by the voltage measurement circuit after a certain period of time elapses from when the charging/discharging circuit starts discharging or charging the cell; and a discharging/charging ending unit that ends the discharge or charge of each of said cells by the charging/discharging circuit when the voltage measured by the voltage measurement circuit reaches the corrected equalization target voltage calculated by the correcting unit.

In the equalization process by the state of charge equalizing device described above, first the equalization target voltage is calculated based on the voltages measured by the plurality of voltage measurement circuits before the plurality of charging/discharging circuits start discharging or charging. And then the cells each having a voltage thereacross different from the equalization target voltage start being discharged or charged by the respective charging/discharging circuits. Thus a current flows in a discharging loop including the cell and the charging/discharging circuit, thereby causing a great voltage drop due to the internal resistance of the cell, the resistance component of and the contact resistance between the terminals existing between the cell terminal and the voltage detecting point, and the resistance component of the voltage detecting wire extending from the cell terminal to the voltage detecting point (hereinafter referred to as a voltage drop due to the internal resistance of the cell and the like). And then a difference is caused between the voltage measured by the voltage measurement circuit and the actual cell voltage.

In the equalization process of the present invention, the corrected equalization target voltage is calculated by correcting the equalization target voltage for each cell that has started being discharged or charged as described above. This correction is performed based on the voltage difference between the voltage measured by the voltage measurement circuit before the charging/discharging circuit starts discharging or charging and the voltage measured by the voltage measurement circuit after a certain period of time elapses from when the charging/discharging circuit starts discharging or charging. Here, the certain period of time is set to a period of time which lasts until the voltage across the cell is stabilized and starts changing due to the discharging or charging by the charging/discharging circuit. The voltage difference can be understood as the amount of voltage drop due to the internal resistance of the cell and the like described above, and the equalization target voltage is corrected to the equalization target voltage calculated with consideration of the amount of voltage drop. Therefore, when the discharging or charging of the cell is ended at the time the voltage measured by the voltage measurement circuit reaches the corrected equalization target voltage, the actual cell voltage coincides with the equalization target voltage before correction, thereby uniforming the voltages of the plurality of cells that form an assembled battery at the equalization target voltage before correction.

In the state of charge equalizing device according to the present invention, the equalization target voltage is corrected to the equalization target voltage calculated with consideration of the amount of voltage drop due to the internal resistance of the cell, the resistance component of the terminal, the contact resistance between the terminals, and the resistance component of the voltage detecting wire as described above, thereby obtaining higher accuracy compared to the structure in which the voltage measurement circuit is connected to both ends of the cell and the structure in which the equalization target voltage is corrected based on the amount of voltage drop due to only the internal resistance of the cell.

In particular, the charging/discharging circuits discharge the respective cells, and the correcting unit calculates the corrected equalization target voltage by subtracting the voltage difference from the equalization target voltage calculated by the equalization target voltage calculating unit.

In the particular structure described above, since a current flows from each cell toward each charging/discharging circuit, the voltage measured by the voltage measurement circuit is lower than the actual cell voltage. Therefore, when the discharging ends at the time the voltage measured by the voltage measurement circuit reaches the corrected equalization target voltage which is lower by the voltage difference than the equalization target voltage before correction, the actual cell voltage coincides with the equalization target voltage before correction.

Further in particular, the charging/discharging starting unit starts discharging each cell in descending order starting with the cell having the highest voltage among the voltages measured by the plurality of voltage measurement circuits before the charging/discharging circuits start discharging, and the correcting unit calculates the corrected equalization target voltage for each cell every time the discharging of the cell is started.

Figure 6:
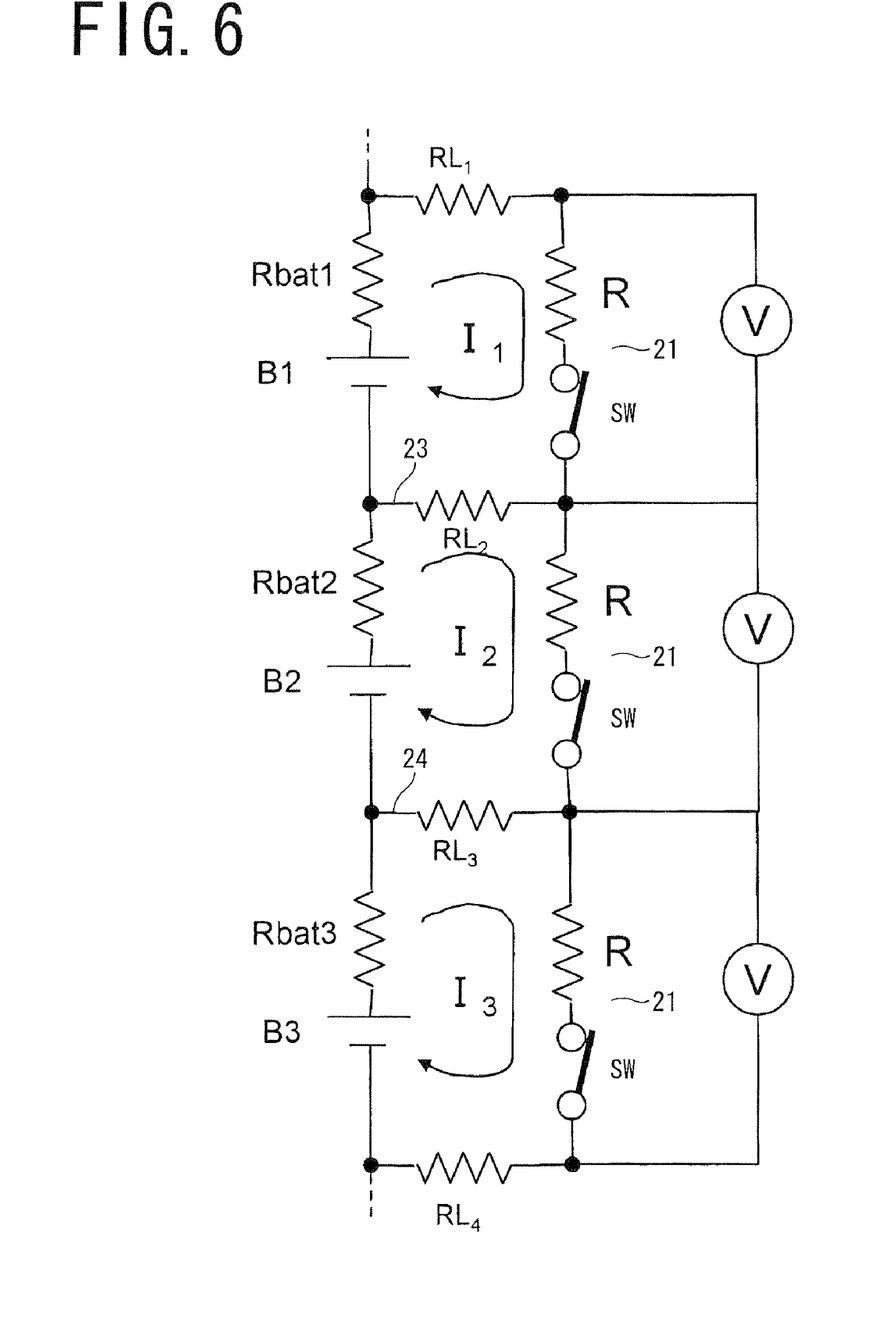
FIG. 6 is a circuit diagram illustrating a main part of the state of charge equalizing device according to the present invention.

For example, in FIG. 6, an assembled battery is formed by three cells B1 to B3. Here, resistance values of resistors R that respectively form three discharging circuits 21, 21, 21 are the same and the cell voltage decreases in the order of the cells B2, B1, and B3. After the discharging of these cells is started at the same time, the discharging of the cell ends in the order of the cells B3, B1, and B2. Therefore, at the time the discharging of the cell B2 is started and the corrected equalization target voltage is calculated, the adjacent cells B1 and B3 are in a state of discharge, while at the time the measured voltage of the cell B2 reaches the corrected equalization target voltage to end the discharge, the cells B1 and B3 are in a discharging stopped state. When the cell B1 is in a state of discharge, the discharge current $I_1$ and discharge current $I_2$ are balanced out in a first current wire 23 extending from a voltage detecting terminal between the negative electrode of the cell B1 and the positive electrode of the cell B2 to a connecting point of a switch SW of the discharge circuit 21 connected to the cell B1 and the resistor R of the discharge circuit 21 connected to the cell B2. And therefore, the magnitude of the current flowing in the current wire 23 is nearly zero. In contrast, after the discharge of the cell B1 ends, since only the discharge current $I_2$ flows in the current wire 23, the amount of voltage drop due to the internal resistance of the cell B2 and the like increases by the amount of voltage drop caused by the discharge current $I_2$ flowing in the current wire 23. Likewise, when the cell B3 is in a state of discharge, discharge current $I_2$ and discharge current $I_3$ are balanced out in a second current wire 24 extending from a voltage detecting terminal between the negative electrode of the cell B2 and the positive electrode of the cell B3 to the connecting point of the switch SW of the discharge circuit 21 connected to the cell B2 and the resistor R of the discharge circuit 21 connected to the cell B3. And therefore, the magnitude of the current flowing in the current wire 24 is nearly zero. In contrast, after the discharge of the cell B3 ends, since only the discharge current $I_2$ flows in the current wire 24, the amount of voltage drop due to the internal resistance of the cell B2 and the like increases by the amount of voltage drop caused by the discharge current $I_2$ flowing in the current wire 24. Therefore, the amount of voltage drop due to the internal resistance of the cell B2 and the like at the time the measured voltage of the cell B2 reaches the corrected equalization target voltage is higher than the amount of voltage drop due to the internal resistance of the cell B2 and the like at the time the discharging of the cell B2 is started. Accordingly, even when the discharging of the cell B2 ends at the time the measured voltage thereof reaches the corrected equalization target voltage, the actual voltage of the cell B2 is slightly higher than the equalization target voltage before correction.

Therefore, in the particular configuration described above, the charging/discharging circuit starts discharging of the cells in descending order in voltage starting with the cell having the highest voltage thereacross, and then the corrected equalization target voltage is calculated for each cell every time the charging/discharging circuit starts discharging of a cell.

In the example described above, the discharging is started in the order of the cells B2, B1, and B3. And therefore, at the time the discharging of the cell B2 is started and the corrected equalization target voltage is calculated, the cells B1 and B3 are in the discharging stopped state. In addition, at the time the measured voltage of the cell B2 reaches the corrected equalization target voltage and the discharging of the cell B2 ends, the discharging of the cells B1 and B3 has already ended and therefore the cells B1 and B3 are in the discharging stopped state. Accordingly, the amount of voltage drop due to the internal resistance of the cell B2 and the like at the time the measured voltage of the cell B2 reaches the corrected equalization target voltage coincides with the amount of voltage drop due to the internal resistance of the cell B2 and the like at the time the discharging of the cell B2 is started. Therefore, when the discharging of the cell B2 is ended at the time the measured voltage of the cell B2 reaches the corrected equalization target voltage, the actual voltage of the cell B2 coincides with the equalization target voltage before correction.

According to the particular structure described above, the actual voltage of each cell coincides with the equalization target voltage before correction, thereby realizing higher accuracy of the equalization process compared to the structure in which the discharging of the cells is started at the same time or almost the same time.

An assembled battery system according to the present invention comprises an assembled battery comprising a plurality of cells connected to each other in series and a state of charge equalizing device equalizing the state of charge of each of the plurality of cells that form the assembled battery, adopting the state of charge equalizing device of the present invention as the state of charge equalizing device.

As described above, according to the state of charge equalizing device of the present invention and the assembled battery system including the device, it is possible to obtain higher accuracy in the equalization process with the same circuit configuration as that in a conventional device.

DETAILED DESCRIPTION OF THE EMBODIMENT

In a preferred embodiment discussed in detail below with reference to the drawings and based on two embodiments, the present invention is implemented in a battery system of a hybrid car.

First Embodiment

Figure 1:
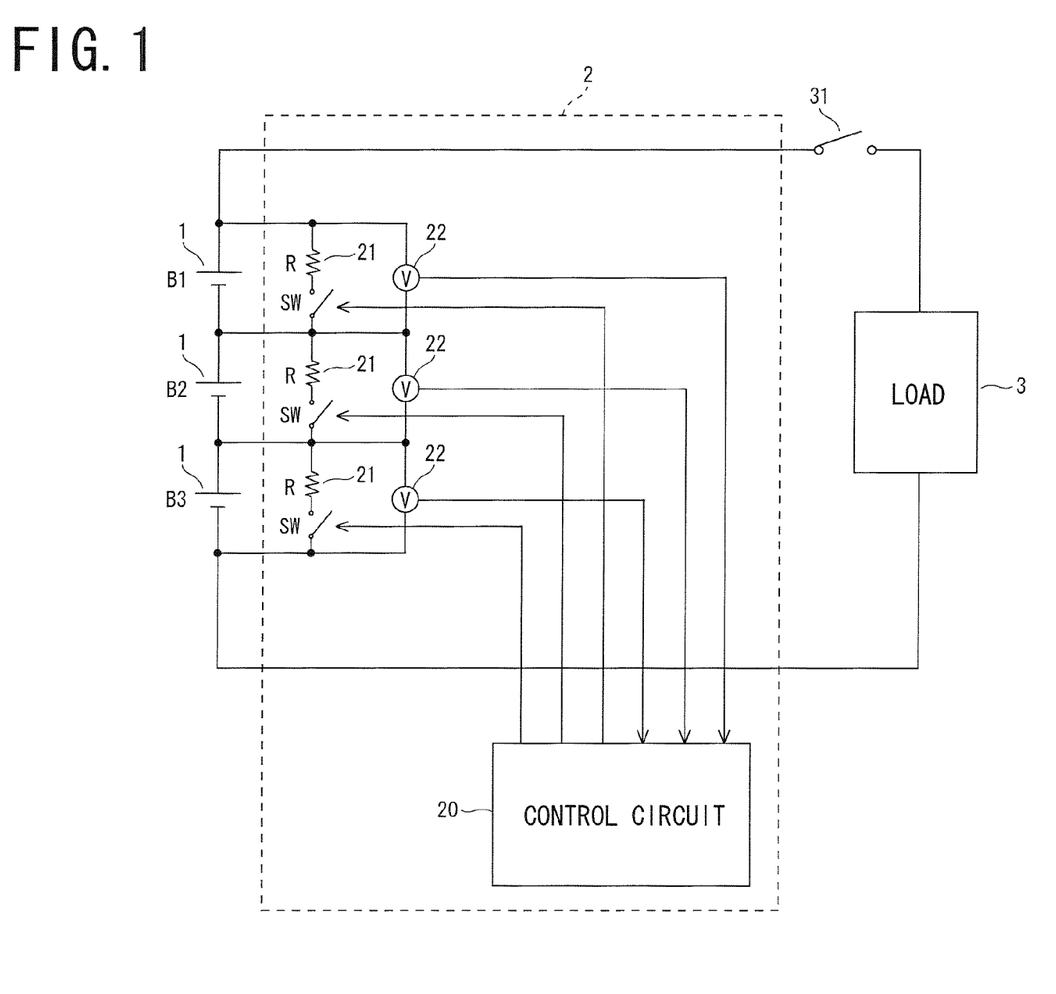
FIG. 1 is a block diagram illustrating a battery system according to the present invention.

As shown in FIG. 1, a battery system according to the present invention comprises an assembled battery comprising a plurality of cells 1 including a lithium ion secondary cell (three cells in the example of the figure) connected to each other in series, and a state of charge equalizing device 2 equalizing a state of charge of the assembled battery. It is possible to supply electrical power from the assembled battery to a load 3.

A power supply path from the assembled battery to the load 3 includes an opening and closing switch 31. When a user operates an ignition switch, which is not shown in the figure, to turn it on, the opening and closing switch 31 closes and the power supply from the assembled battery to the load 3 starts, while when a user operates the ignition switch to turn it off, the opening and closing switch 31 opens and the power supply from the assembled battery to the load 3 stops.

A discharge circuit 21 comprising a resistor R and a switch SW connected to each other in series is connected to both ends of each cell 1 in parallel with respect to the cell 1, and a voltage measurement circuit 22 measuring the voltage across each cell (open-circuit voltage) is connected to both ends of each discharge circuit 21.

The measurement results obtained by the respective voltage measurement circuits 22 are provided to a control circuit 20, and the control circuit 20 calculates an equalization target voltage based on the measurement results in the manner to be described later to control the switching operation of the switch SW of each discharge circuit 21 based on the calculated equalization target voltage and the measurement results obtained by the voltage measurement circuits 22.

Figure 2:
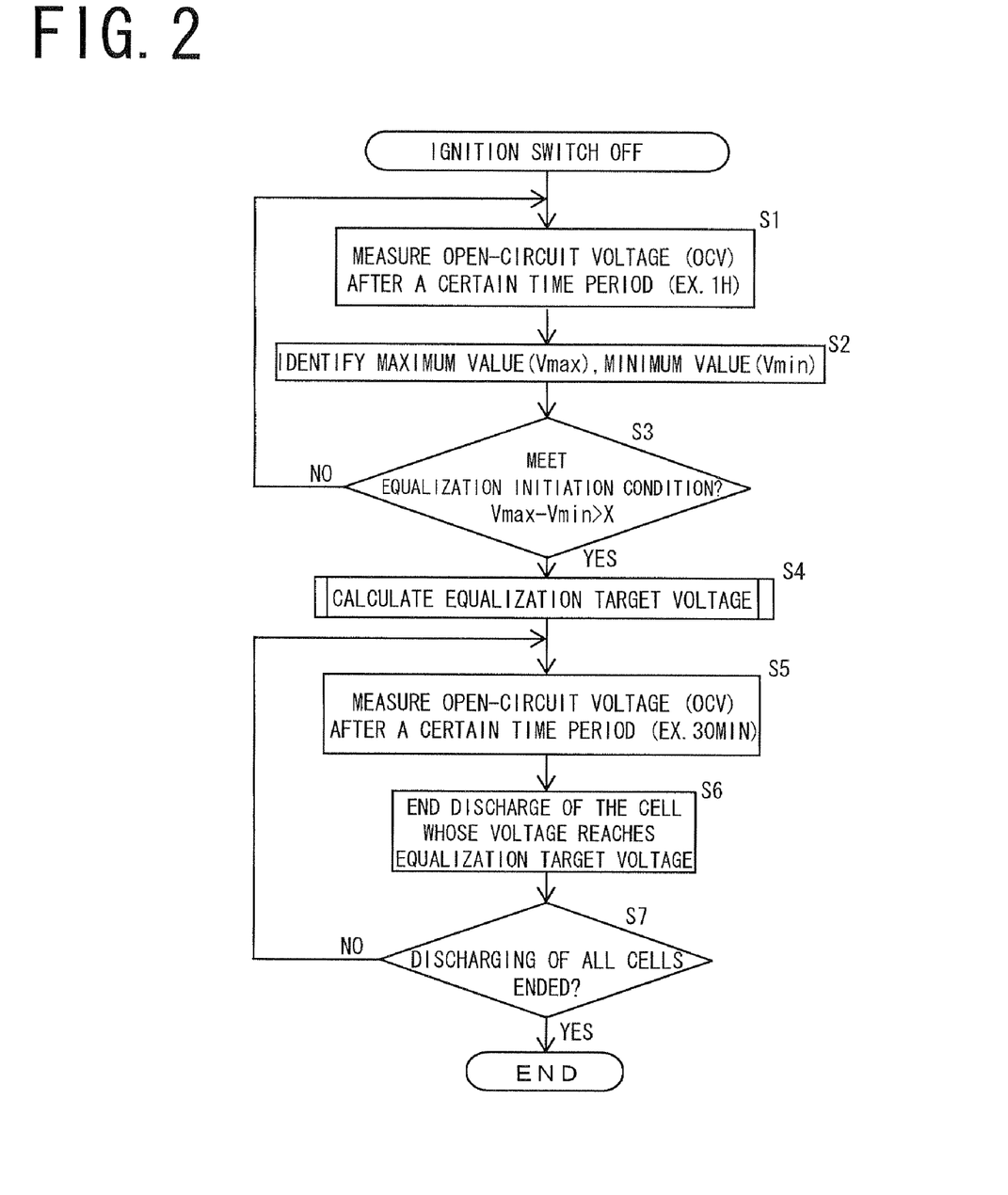
FIG. 2 is a flowchart showing a procedure of an equalization process according to the present invention.

FIG. 2 shows the procedure of the equalization process performed by the control circuit 20 of the state of charge equalizing device 2 when the ignition switch of a hybrid car is set to off. When the ignition switch is set to off, first in step S1, the control circuit 20 measures the open-circuit voltages of the plurality of cells that form the assembled battery after the elapse of a certain period of time, for example one hour. And then in step S2, the control circuit 20 identifies a maximum value Vmax and a minimum value Vmin of the measured plurality of open-circuit voltages. Subsequently in step S3, the control circuit 20 determines whether or not the difference between the identified maximum value Vmax and minimum value Vmin exceeds a predetermined value X. When it determines NO, the process returns to step S1.

When the difference between the identified maximum value Vmax and minimum value Vmin exceeds the predetermined value X and therefore the control circuit 20 determines YES in step S3, the process proceeds to step S4, and the process of calculating the equalization target voltage is performed. The particular procedure of the equalization target voltage calculating process in step S4 is to be described later.

Next in step 5, after the elapse of a certain period of time, for example 30 minutes, the control circuit 20 measures the open-circuit voltages of the plurality of cells that form the assembled battery. Then in step S6, the control circuit 20 ends discharging of the cell whose measured open-circuit voltage reaches the equalization target voltage. Finally in step S7, the control circuit 20 determines whether or not the discharging of all the cells having a higher voltage than the equalization target voltage calculated in step S4 has ended. When it determines NO, the process returns to step S5. And then, when the discharging of said all cells ends, the control circuit 20 determines YES in step S7, and ends the procedure above.

Figure 3:
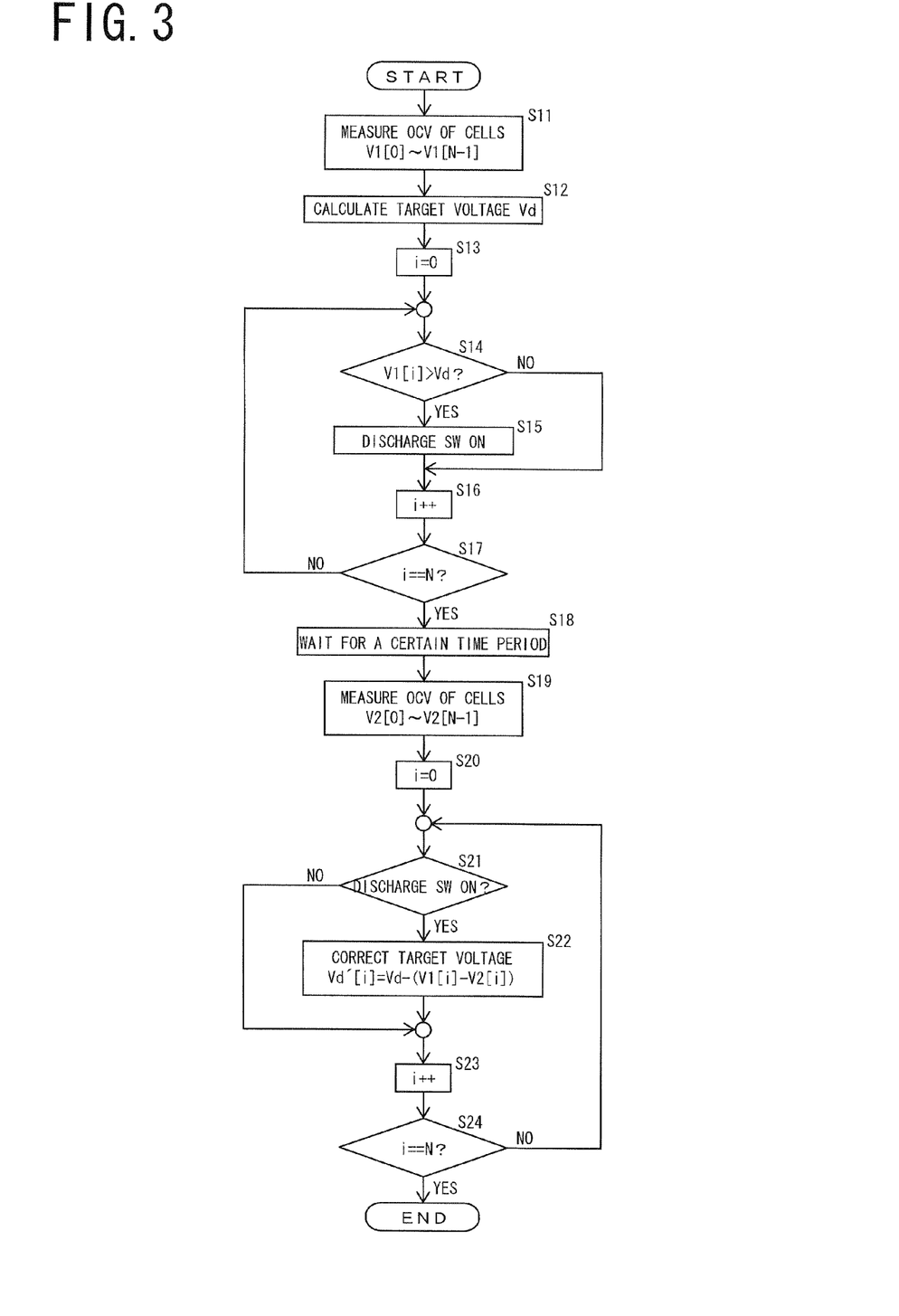
FIG. 3 is a flowchart showing a particular procedure of an equalization target voltage calculating process of the first embodiment of the present invention.

FIG. 3 shows the particular procedure of the equalization target voltage calculating process in step S4 described above. First in step S11, the control circuit 20 measures the open-circuit voltages V1[0] to V1[N−1] (N is the number of cells) of the plurality of cells that form an assembled battery. Next in step S12, the control circuit 20 calculates the equalization target voltage Vd from the plurality of open-circuit voltages obtained in the measurement. In this embodiment, the control circuit 20 identifies a minimum value Vmin from the plurality of open-circuit voltages obtained in the measurement, and adds a predetermined value $\alpha$ to the minimum value Vmin to calculate the equalization target voltage Vd (=Vmin+$\alpha$). Here, the predetermined value $\alpha$ is set to a value around the measurement deviation of the voltage measurement circuit itself. Also, in the case where the calculated equalization target voltage Vd is less than a predetermined lower limit, the equalization target voltage Vd is set to the lower limit. In addition, in step S12, the equalization target voltage Vd is calculated from the open-circuit voltage measured in step S11, however, it is also possible to omit the measurement process in step S11 and calculate the equalization target voltage Vd from the open-circuit voltage measured in step S1 of FIG. 2.

Subsequently in step S13 of FIG. 3, the cell number i is reset to zero, and then in step S14, the control circuit 20 determines whether or not the open-circuit voltage of the cell with the cell number i V1[i] is higher than the equalization target voltage Vd. When it determines YES, the process proceeds to step S15 and the switch of the discharge circuit connected to the cell is set to ON to start discharging, and then in step S16, the cell number i is increased by one. Next in step S17, the control circuit 20 determines whether or not the cell number i is the same as the number of cells N that form the assembled battery. When it determines NO, the process returns to step S14 and the procedure described above is repeated. Here, while the procedure is repeated, in the case where the open-circuit voltage of the cell V1[i] is less than or equal to the equalization target voltage Vd, and therefore the control circuit 20 determines NO in step S14, the process proceeds to step S16, bypassing step S15.

Subsequently, the control circuit 20 determines whether or not the open-circuit voltage V1[i] is higher than the equalization target voltage Vd for all the cells that form the assembled battery. And then, when the discharging of all the cells having the open-circuit voltage V1[i] higher than the equalization target voltage Vd is started, the control circuit 20 determines YES in step S17 and the process proceeds to step S18 to wait for a certain period of time. Here, the certain period of time is set to a period of time which lasts until the voltage across the cell is stabilized and starts to decrease due to the discharging, for example 100 msec.

Next in step S19, the open-circuit voltages V2[0] to V2[N−1] (N is the number of cells) of the plurality of cells that form the assembled battery are measured, and then in step S20, the cell number i is reset to zero. Subsequently in step S21, the control circuit 20 determines whether or not the switch of the discharge circuit connected to the cell with the cell number i is ON. When it determines YES, the process proceeds to step S22, and the equalization target voltage Vd calculated in step S12 described above is corrected using the formula 2 below based on the open-circuit voltage V1[i] measured in step S11 before the discharging is started and the open-circuit voltage V2[i] measured in step S19 after the discharging is started.

The corrected equalization target voltage $Vd'[i] = Vd − (V1[i] − V2[i])$     Formula 2

Subsequently in step S23, the cell number is increased by one, and then in step S24, the control circuit 20 determines whether or not the cell number i is the same as the number of cells N that form the assembled battery. When it determines NO, the process returns to step S21 and the procedure described above is repeated. Here, while the procedure is repeated, when the switch of the discharge circuit is OFF and the control circuit 20 determines NO in step S21, the process proceeds to step S23, bypassing step S22.

After that, the control circuit 20 determines whether or not the switch of the discharge circuit is ON for all the cells that form the assembled battery. And then, when the corrected equalization target voltage is calculated for all the cells with the switch of the discharge circuit ON, the control circuit 20 determines YES in step S24 and ends the equalization target voltage calculating process described above.

After the discharging of all the cells having an open-circuit voltage higher than the equalization target voltage before correction Vd is started with the procedure described above, the corrected equalization target voltage Vd' is calculated for each of the cells. And then, when the voltage measured by each voltage measurement circuit reaches the corrected equalization target voltage, the discharging of each cell ends.

Figure 4:
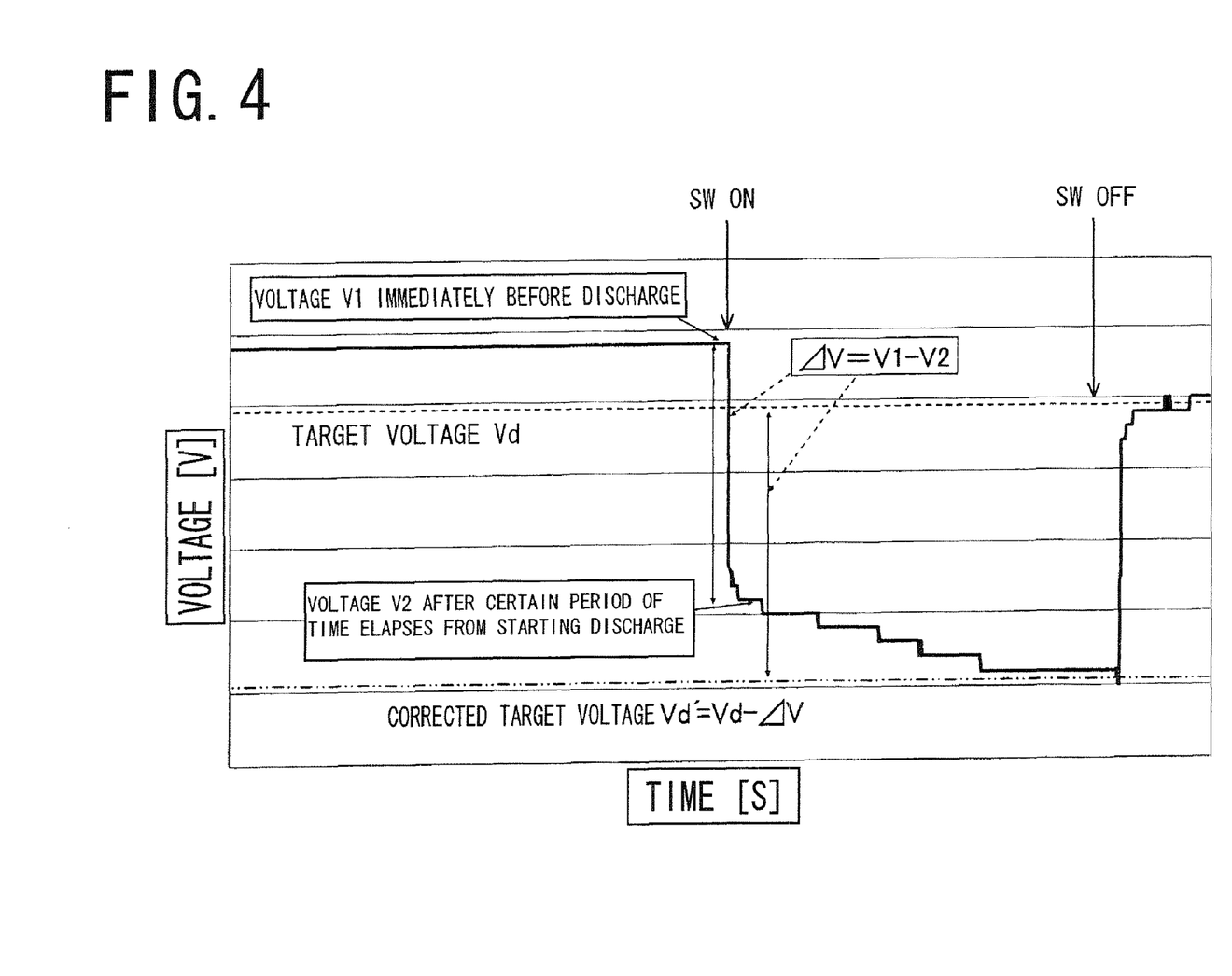
FIG. 4 is a graph showing the change in the cell voltage measured by a voltage measurement circuit in the equalization process of the present invention.

FIG. 4 shows the changes in the cell voltage measured by the voltage measurement circuit in the equalization process performed by the control circuit. As shown in the figure, when the switch SW of the discharge circuit is set to ON and the discharging is started, the discharge current flows in a discharging loop including the cell and the discharge circuit, and a great voltage drop is caused due to the internal resistance of the cell, thereby drastically decreasing the measured voltage of the cell. Therefore, the voltage difference ΔV between the measured voltage at the time when the certain period of time has elapsed from when the discharge starts V2 and the measured voltage before starting discharging V1 can be understood as the amount of voltage drop due to the internal resistance of the cell and the like. Therefore, due to the correction described above, the equalization target voltage Vd is corrected to the equalization target voltage Vd' (=Vd−ΔV) which is lower by the amount of voltage drop.

After decreasing drastically described above, the measured voltage of the cell gradually decreases due to the discharging. And then, when the measured voltage reaches the corrected equalization target voltage Vd' and the switch of the discharge circuit is set to OFF, the discharge current stops flowing in the discharging loop, whereby the measured voltage increases by the amount of voltage drop to become nearly the same as the equalization target voltage before correction Vd. Therefore, the voltages of the plurality of cells that form the assembled battery are generally uniform at the equalization target voltage before correction Vd.

In the state of charge equalizing device of this embodiment, the equalization target voltage is corrected to an equalization target voltage lower by the amount of voltage drop due to the internal resistance of the cell, the resistance component of the terminal, the contact resistance between the terminals and the resistance component of the voltage detecting wire, thereby obtaining higher accuracy in the equalization process than in the structure in which the voltage measurement circuit 52 is connected to both ends of the cell 4 as shown in FIG. 11 and the structure in which the equalization target voltage is corrected based only on the amount of voltage drop due to the internal resistance of the cell.

Second Embodiment

In the state of charge equalizing device of the first embodiment, the equalization target voltage is corrected after the switches of all the discharge circuits connected to the cells which need to be discharged are set to ON. In contrast, in the state of charge equalizing device of this embodiment, the switches of the discharge circuits connected to the cells which need to be discharged are set to ON in descending order in voltage starting with the cell with the highest voltage, and the equalization target voltage is corrected every time the switch of one discharge circuit is set to ON.

The structure of the state of charge equalizing device of this embodiment is the same as the state of charge equalizing device of the first embodiment shown in FIG. 1 except for the control circuit. Therefore, the description thereof is omitted. Also, the entire procedure of the equalization process performed by the control circuit is the same as the procedure of the first embodiment shown in FIG. 2. Therefore, the description thereof is omitted.

Figure 5:
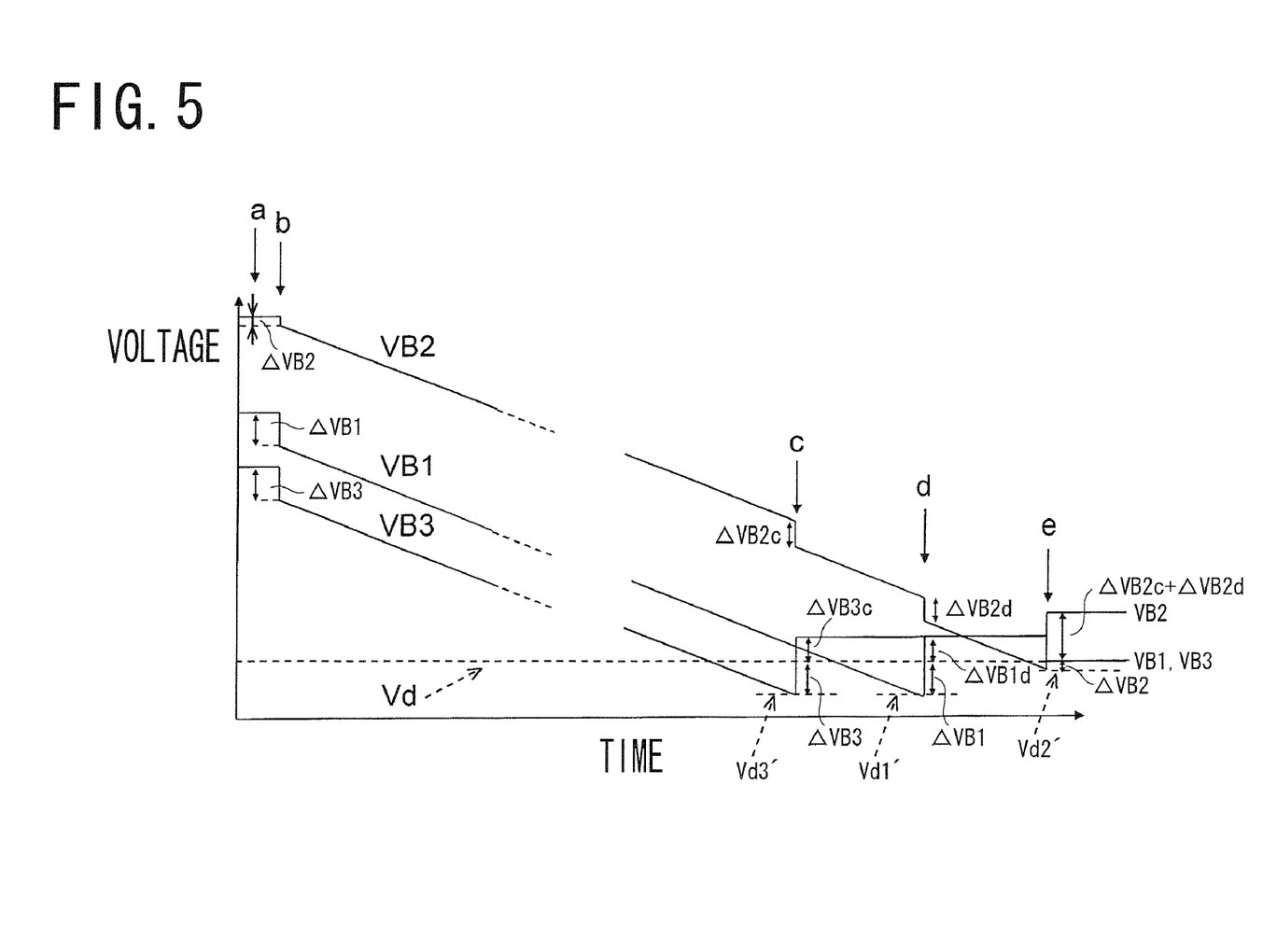
FIG. 5 is a graph showing the change in the cell voltages measured by the respective voltage measurement circuits in the equalization process of the first embodiment.

FIG. 5 shows the changes in the cell voltages of the cells B1 to B3 measured by the respective voltage measurement circuits in the equalization process of the first embodiment. Here, the voltage decreases in the order of the cells B2, B1, and B3. The resistance values of the resistors of the discharge circuits connected to the cells B1 to B3 respectively are the same. Also, as shown in FIG. 6, the discharge currents flowing in the discharging loops are $I_1$, $I_2$, and $I_3$. And the internal resistances of the cells are Rbat1, Rbat2, and Rbat3. Further, the resistance components of the terminals, the contact resistance between the terminals, and the resistance component of the voltage detecting wire are RL1, RL2, RL3, and RL4. The magnitudes of discharge currents $I_1$, $I_2$, and $I_3$ are almost the same.

In this equalization process, first, the open-circuit voltage of each cell is measured in a state where the switches of the discharge circuits connected to the cells B1 to B3 are set to OFF (at "a" point shown in FIG. 5). And then, these switches of the discharge circuits are set to ON at almost the same time, thereby starting discharging the cells B1 to B3 (at "b" point shown in FIG. 5). As a result, the discharge current flows in each discharging loop including each cell, thereby causing a great voltage drop to drastically decrease the measured voltage of each cell VB1, VB2, and VB3. The amounts of voltage drop ΔVB1, ΔVB2, and ΔVB3 are calculated as correction amounts of the equalization target voltage Vd for the cells respectively. Here, as shown in FIG. 6, discharge current $I_1$ and discharge current $I_2$ are balanced out in the first current wire 23 extending from a voltage detecting terminal between the negative electrode of the cell B1 and the positive electrode of the cell B2 to a connecting point of the switch SW of the discharge circuit 21 connected to the cell B1 and the resistor R of the discharge circuit 21 connected to the cell B2. And therefore, the magnitude of the current flowing in the current wire 23 is nearly zero. Likewise, the discharge current $I_2$ and discharge current $I_3$ are balanced out in the second current wire 24 extending from a voltage detecting terminal between the negative electrode of the cell B2 and the positive electrode of the cell B3 to a connecting point of the switch SW of the discharge circuit 21 connected to the cell B2 and the resistor R of the discharge circuit 21 connected to the cell B3. And therefore, the magnitude of the current flowing in the current wire 24 is nearly zero. Accordingly, the measured voltage VB2 of the cell B2 decreases by the amount of voltage drop due to the internal resistance of the cell B2 (ΔVB2=$I_2$·Rbat2).

And then, the voltages of the cells B1 to B3 gradually decrease. When the measured voltage VB3 of the cell B3, which had the lowest open-circuit voltage, reaches the corrected equalization target voltage Vd3', the switch of the discharge circuit connected to the cell B3 is set to OFF and the discharging of the cell ends (at "c" point shown in FIG. 5). Here, the measured voltage VB3 of the cell B3 becomes slightly higher than the equalization target voltage before correction Vd, and the reason thereof is thought to be as follows.

In a state where the switch of the discharge circuit connected to the cell B3 is ON, the discharge current $I_2$ and the discharge current $I_3$ are balanced out in the second current wire 24 shown in FIG. 6, and therefore, the magnitude of the current flowing in the current wire 24 is nearly zero. In contrast, when the switch SW of the discharge circuit 21 connected to the cell B3 is set to OFF, only the discharge current $I_2$ flows in the current wire 24. Therefore, the measured voltage VB3 of the cell B3 increases by not only the amount of voltage drop $\Delta$VB3 generated when the switch SW of the discharge circuit 21 is set to ON, but also the amount of voltage drop $\Delta$VB3$c$ (=$I_2 \cdot RL_3$) generated by the discharge current $I_2$ flowing in the current wire 24 to become higher than the equalization target voltage before correction Vd by the amount of voltage drop $\Delta$VB3$c$.

Also, when the switch SW of the discharge circuit 21 connected to the cell B3 is set to OFF, only the discharge current $I_2$ flows in the current wire 24 as described above. Therefore, in the discharging loop including the cell B2, the amount of voltage drop due to the internal resistance of the cell B2 and the like increases by the amount of voltage drop generated by the discharge current $I_2$ flowing in the current wire 24 (=$I_2 \cdot RL_3$), and the measured voltage VB2 of the cell B2 decreases by the same amount ($\Delta$VB2$c$=$I_2 \cdot RL_3$).

After that, the voltages of the cells B2 and B1 gradually decrease, and when the measured voltage VB1 of the cell B1 which had the second lowest open-circuit voltage reaches the corrected equalization target voltage Vd1', the switch of the discharge circuit connected to the cell B1 is set to OFF to end the discharging of the cell B1 (at "d" point shown in FIG. 5). Here, in the same manner as when the switch SW of the discharge circuit 21 connected to the cell B3 is set to OFF, only the discharge current $I_2$ flows in the first current wire 23 shown in FIG. 6, and therefore, the measured voltage VB1 of the cell B1 increases by the sum of the amount of voltage drop $\Delta$VB1 generated when the switch SW of the discharge circuit 21 is set to ON and the amount of voltage drop VB1$d$ (=$I_2 \cdot RL_2$) generated due to the discharge current $I_2$ flowing in the current wire 23 to become higher than the equalization target voltage before correction Vd by the amount of voltage drop $\Delta$VB1$d$. Here, in the discharging loop including the cell B2, the amount of voltage drop due to the internal resistance of the cell B2 and the like increases by the amount of voltage drop (=$I_2 \cdot RL_2$) caused by the discharge current $I_2$ flowing in the current wire 23, and the measured voltage VB2 of the cell B2 decreases by the same amount ($\Delta$VB2$d$=$I_2 \cdot RL_2$).

Thereafter, when the voltage of the cell B2 gradually decreases and the measured voltage VB2 of the cell B2 reaches the corrected equalization target voltage Vd2', the switch of the discharge circuit connected to the cell B2 is set to OFF, and the discharging of the cell B2 ends (at "e" point shown in FIG. 5). Here, the measured voltage VB2 of the cell B2 is slightly higher than the equalization target voltage before correction Vd. The reason thereof is thought to be as follows.

At the time the equalization target voltage Vd for the cell B2 is corrected (at "b" point shown in FIG. 5), the adjacent cells B1 and B3 are in a state of discharge. In contrast, at the time the measured voltage VB2 of the cell B2 reaches the corrected equalization target voltage Vd2' and the discharging ends (at "e" point shown in FIG. 5), the cells B1 and B3 are in a discharging stopped state. As described above, at the time the discharging of each of the cells B1 and B3 ends (at "c" and "d" points shown in FIG. 5), the amount of voltage drop due to the internal resistance of the cell B2 and the like slightly increases. Therefore, the amount of voltage drop due to the internal resistance of the cell B2 and the like at the time the measured voltage VB2 of the cell B2 reaches the corrected equalization target voltage Vd2' (at "e" point shown in FIG. 5) is the sum of the amount of voltage drop $\Delta$VB2 caused when the switch of the discharge circuit is set to ON, and the amounts of voltage drop caused when the discharging of each of the cells B3 and B1 ends $\Delta$VB2$c$, $\Delta$VB2$d$. Thus, even if the discharging of the cell B2 ends at the time the measured voltage VB2 of the cell B2 reaches the corrected equalization target voltage Vd2', the measured voltage VB2 of the cell B2 is higher than the equalization target voltage before correction Vd by the sum of the amounts of voltage drop caused when the discharging of each of the cells B3 and B1 ends $\Delta$VB2$c$ and $\Delta$VB2$d$.

In addition, when the discharging of the cell B2 ends, the discharge current $I_2$ stops flowing in the first current wire 23, and therefore, the measured voltage VB1 of the cell B1 decreases by the amount that was exceeding the equalization target voltage before correction Vd ($\Delta$VB1$d$=$I_2 \cdot RL_2$) due to the discharge current $I_2$ flowing in the current wire 23 as described above, thereby coinciding with the equalization target voltage before correction Vd. In the same manner as for the cell B1, the measured voltage VB3 of the cell B3 increases by the amount that was exceeding the equalization target voltage before correction Vd ($\Delta$VB3$c$=$I_2 \cdot RL_3$) due to the discharge current $I_2$ flowing in the second current wire 24, thereby coinciding with the equalization target voltage before correction Vd.

As described, according to the equalization process of the first embodiment, after the equalization process, the plurality of cells that form an assembled battery includes a cell having a voltage higher than the equalization target voltage before correction Vd, and therefore, the voltages of the plurality of cells vary slightly. This variation is within the acceptable range for accuracy of the equalization process.

Accordingly, in the equalization process of this embodiment, the switch of the discharge circuit is set to ON in descendent order in the voltage across the cell starting with the cell with the highest voltage, and the equalization target voltage is corrected every time the switch of a discharge circuit is set to ON.

Figure 7:
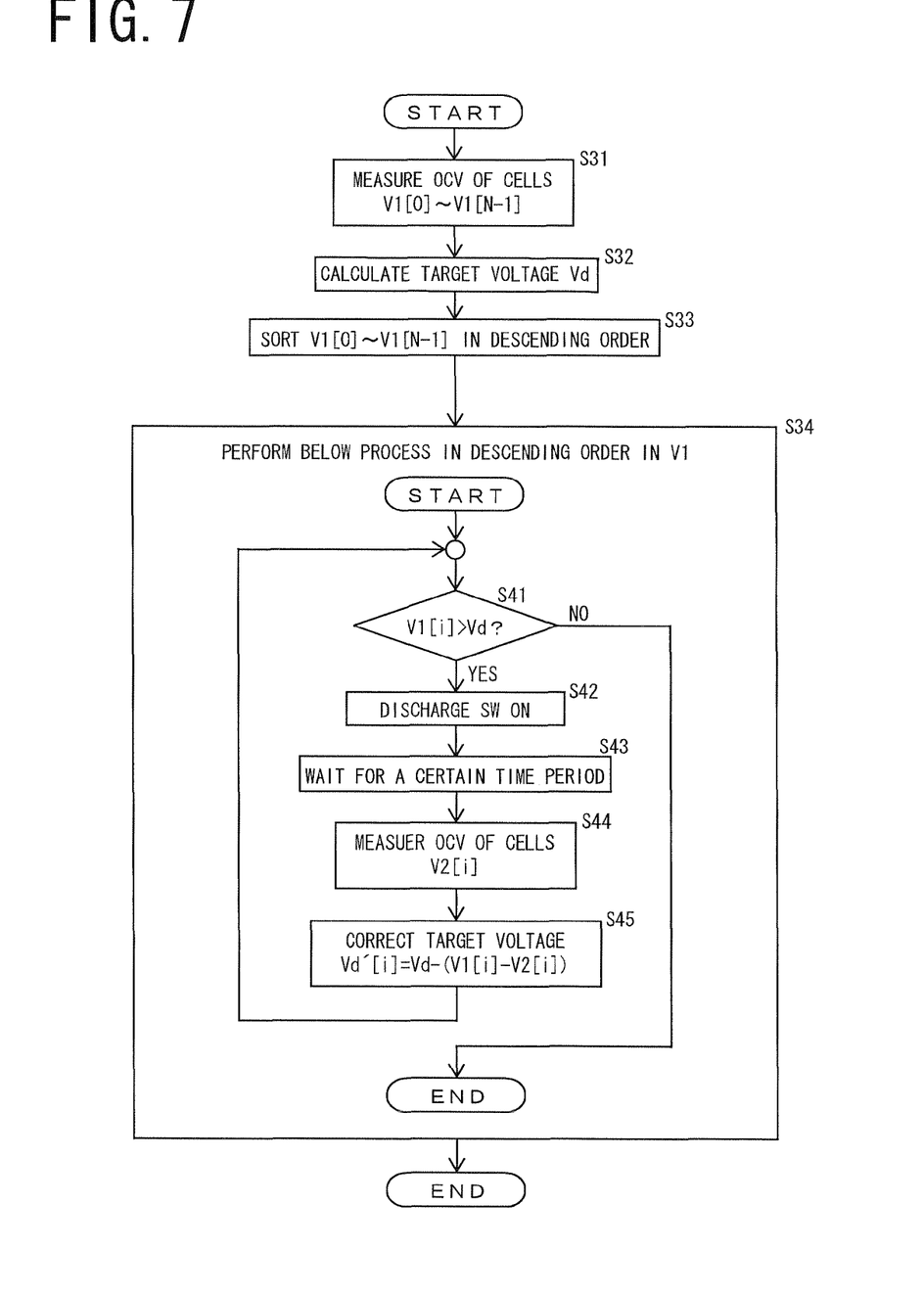
FIG. 7 is a flowchart showing a particular procedure of the equalization target voltage calculating process of the second embodiment.

FIG. 7 shows the particular procedure of the equalization target voltage calculation process performed by the control circuit of this embodiment. First in step S31, the control circuit measures the open-circuit voltages of the plurality of cells that form an assembled battery V1[0] to V1[N−1] (N is the number of cells). And then in step S32, the control circuit calculates the equalization target voltage Vd from the plurality of open-circuit voltages obtained in the measurement. In this embodiment, the control circuit identifies a minimum value Vmin from the plurality of open-circuit voltages obtained in the measurement, and adds a predetermined value $\alpha$ to the minimum value Vmin to calculate the equalization target voltage Vd (=Vmin+$\alpha$). The predetermined value $\alpha$ is set to a value around the measurement deviation of the voltage measurement circuit itself. Also, in the case where the calculated equalization target voltage Vd is less than a predetermined lower limit, the equalization target voltage Vd is set to the lower limit. Here, in step S32, the equalization target voltage Vd is calculated from the open-circuit voltages measured in step S31, however, it is also possible to calculate the equalization target voltage Vd from the open-circuit voltages measured in step S1 of FIG. 2.

Subsequently in step S33 of FIG. 7, the plurality of open-circuit voltages V1[0] to V1[N−1] measured in step S31 are sorted in descending order, and in step S34, a process to be described later is performed on the cells in descending order in voltage and the process ends.

In the process of step S34, first in step S41, the control circuit determines whether or not the open-circuit voltage of the cell with the cell number i V1[i] is higher than the equalization target voltage Vd. If it determines YES, the process proceeds to step S42, then the switch of the discharge circuit connected to the cell is set to ON to start discharging, and wait for a certain period of time in step S43. Here, the certain period of time is set to a period of time which lasts until the voltage across the cell is stabilized and starts decreasing due to the discharging, for example 100 msec.

Next in step S44, the open-circuit voltage of the cell V2[i] is measured. And then in step S45, the control circuit corrects the equalization target voltage calculated in step S32 described above, using the formula 2 above based on the open-circuit voltage V1[i] measured in step S31 before the discharging is started and the open-circuit voltage V2[i] measured in step S44 after the discharging is started. And then, the process returns to step S41. When the open-circuit voltage of the cell is less than or equal to the equalization target voltage Vd and therefore it determines NO in step S41, it is not necessary to discharge, therefore the process ends.

In the process shown in FIG. 7, the discharging is started for the cells having an open-circuit voltage higher than the equalization target voltage Vd in descending order in the open-circuit voltage, and the corrected equalization target voltage Vd' is calculated for a cell every time the discharging of the cell starts.

Figure 8:
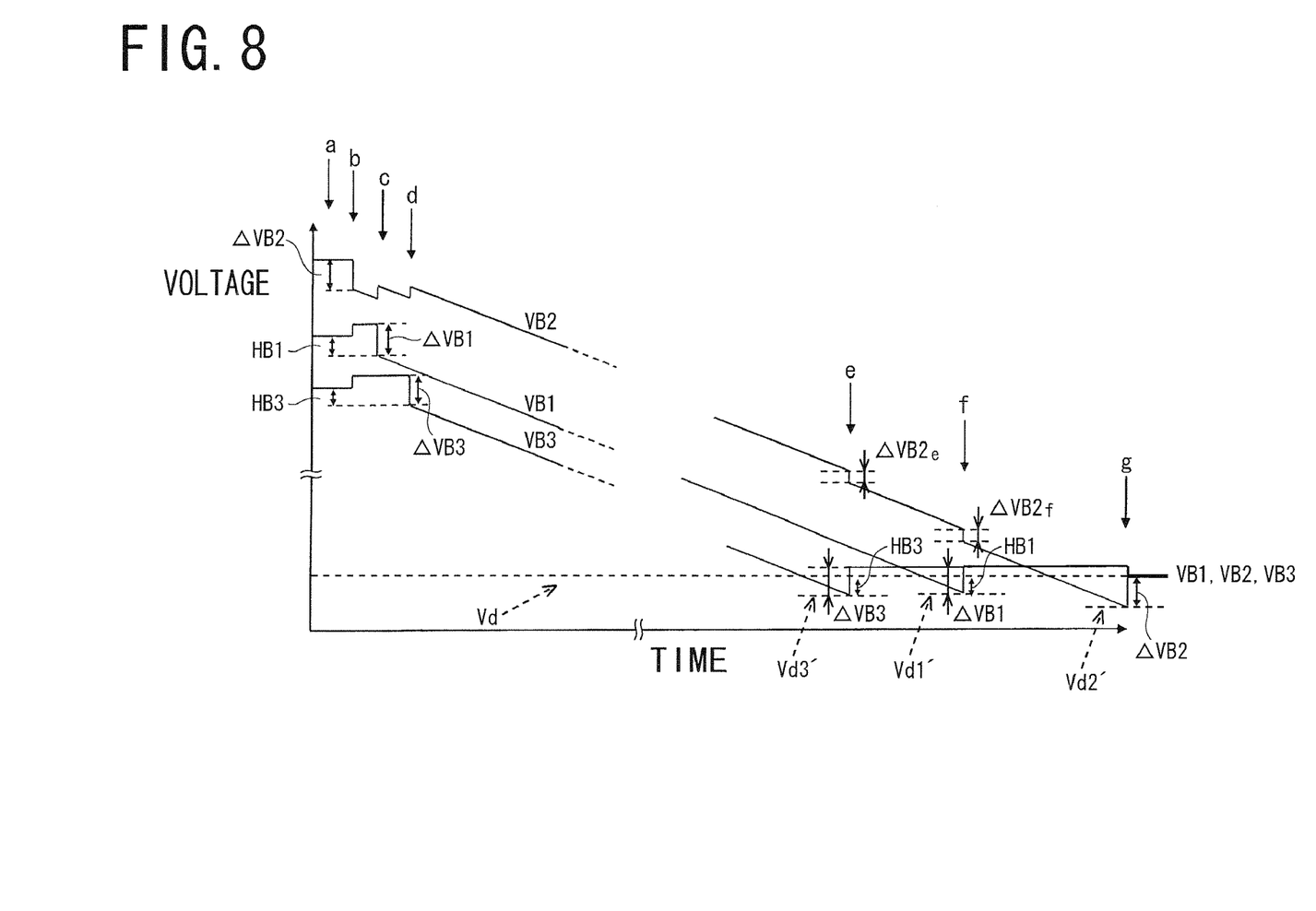
FIG. 8 is a graph showing the change in the cell voltages measured by the respective voltage measurement circuits in the equalization process of the second embodiment.

FIG. 8 shows the changes in the cell voltages of the cells B1 to B3 measured by the respective voltage measurement circuits in the equalization process of this embodiment. Here, the voltage decreases in the order of the cells B2, B1, and B3. The resistance values of the resistors R of the discharge circuits connected to the cells B1 to B3 respectively are the same. Also, as shown in FIG. 6, the discharge currents flowing in the discharging loops are $I_1$, $I_2$, and $I_3$. And the internal resistances of the cells are Rbat1, Rbat2, and Rbat3. Further, the resistance component of the terminal, the contact resistance between the terminals, and the resistance component of the voltage detecting wire are RL1, RL2, RL3, and RL4.

The magnitudes of discharge currents $I_1$, $I_2$, and $I_3$ are almost the same.

In this equalization process, first, the open-circuit voltage of each of the cells B1 to B3 is measured in a state where the switches of the discharge circuits connected to the cells are set to OFF (at "a" point shown in FIG. 8). And then, the switch of the discharge circuit connected to the cell B2 having the highest open-circuit voltage is set to ON, and the discharging of the cell B2 is started (at "b" point shown in FIG. 8). This makes a discharge current flow in the discharging loop including the cell B2, thereby causing a great voltage drop due to the internal resistance of the cell B2 and the like, resulting in a drastic decrease of the measured voltage VB2 of the cell B2. The amount of voltage drop ΔVB2 is calculated as a correction amount of the equalization target voltage Vd for the cell B2. Also, the discharge current $I_2$ flows in the first current wire 23 shown in FIG. 6. Therefore, the measured voltage VB1 of the cell B1 increases by the amount of voltage drop (=$I_2 \cdot RL_2$) caused by the discharge current $I_2$ flowing in the current wire 23. In the same manner as for the cell B1, the measured voltage VB3 of the cell B3 increases by the amount of voltage drop (=$I_2 \cdot RL_3$) caused by the discharge current $I_2$ flowing in the second current wire 24.

Next, the switch of the discharge circuit connected to the cell B1 is set to ON and the discharging of the cell B1 is started (at "c" point shown in FIG. 8). This makes a discharge current flow in the discharging loop including the cell B1, thereby causing a great voltage drop due to the internal resistance of the cell B1 and the like, resulting in a drastic decrease of the measured voltage VB1 of the cell B1. Here, the difference between the amount of voltage drop ΔVB1 and the amount of increase in voltage at the time discharging of the cell B2 is started (at "b" point shown in FIG. 8) is calculated as a correction amount HB1 of the equalization target voltage Vd. Also, the discharge current $I_1$ and the discharge current $I_2$ are balanced out in the first current wire 23 shown in FIG. 6 and the magnitude of the current flowing in the current wire 23 decreases to nearly zero. Therefore, the amount of voltage drop due to the internal resistance of the cell B2 and the like in the discharging loop including the cell B2 decreases by the amount of voltage drop (=$I_2 \cdot RL_2$) caused by the discharge current $I_2$ flowing in the current wire 23, increasing the measured voltage VB2 of the cell B2 by the same amount.

Subsequently, the switch of the discharge circuit connected to the cell B3 is set to ON, and the discharging of the cell B3 is started (at "d" point shown in FIG. 8). This makes a discharge current flow in the discharging loop including the cell B3, thereby causing a great voltage drop due to the internal resistance of the cell B3 and the like, resulting in a drastic decrease of the measured voltage VB3 of the cell B3. Here, the difference between the amount of voltage drop ΔVB3 and the amount of increase in voltage at the time discharging of the cell B2 is started (at "b" point shown in FIG. 8) is calculated as a correction amount HB3 of the equalization target voltage Vd. Also, the discharge current $I_2$ and the discharge current $I_3$ are balanced out in the second current wire 24 shown in FIG. 6 and the magnitude of the current flowing in the current wire 24 decreases to nearly zero. Therefore, the amount of voltage drop due to the internal resistance of the cell B2 and the like in the discharging loop including the cell B2 decreases by the amount of voltage drop (=$I_2 \cdot RL_3$) caused by the discharge current $I_2$ flowing in the current wire 24, increasing the measured voltage VB2 of the cell B2 by the same amount.

Thereafter, the voltages of the cells B1 to B3 gradually decrease, and when the measured voltage VB3 of the cell B3, which had the lowest open-circuit voltage, reaches the corrected equalization target voltage Vd3', the switch of the discharge circuit connected to the cell B3 is set to OFF and the discharging of the cell B3 ends (at "e" point shown in FIG. 8). Here, the adjacent cell B2 is in a state of discharge as well as at the time when the discharging of the cell B3 was started (at "d" point shown in FIG. 8). Therefore, the measured voltage VB3 of the cell B3 increases by the amount of voltage drop ΔVB3 caused when the discharging was started, and becomes higher than the equalization target voltage before correction Vd by the amount of voltage drop (=$I_2 \cdot RL_3$) caused when the discharging of the cell B2 was started (at "b" point shown in FIG. 8). Here, since only the discharge current $I_2$ flows in the second current wire 24 shown in FIG. 6, the amount of voltage drop due to the internal resistance of the cell B2 and the like increases by the amount of voltage drop (ΔVB2e=$I_2 \cdot RL_3$) caused by the discharge current $I_2$ flowing in the current wire 24 in the discharging loop including the cell B2, whereby the measured voltage VB2 of the cell B2 decreases by the amount ΔVB2e.

Thereafter, the voltages of the cells B2 and B1 gradually decrease, and when the measured voltage VB1 of the cell B1 which had the second lowest open-circuit voltage reaches the corrected equalization target voltage Vd1', the switch of the discharge circuit connected to the cell B1 is set to OFF and discharging of the cell B1 ends (at "f" point shown in FIG. 8). Here, the adjacent cell B2 is in a state of discharge as well as at the time when the discharging of the cell B1 was started (at "c" point shown in FIG. 8). Therefore, the measured voltage VB1 of the cell B1 increases by the amount of voltage drop ΔVB1 caused when the discharging was started, and becomes higher than the equalization target voltage before correction Vd by the amount of voltage drop (=$I_2 \cdot RL_2$) caused when the discharging of the cell B2 was started (at "b" point shown in FIG. 8). Here, since only the discharge current $I_2$ flows in the first current wire 23 shown in FIG. 6, the amount of voltage drop due to the internal resistance of the cell B2 and the like increases by the amount of voltage drop ($\Delta VB2f$=$I_2 \cdot RL_2$) caused by the discharge current $I_2$ flowing in the current wire 23 in the discharging loop including the cell B2, whereby the measured voltage VB2 of the cell B2 decreases by the amount $\Delta VB2f$.

And then, the voltage of the cell B2 gradually decreases, and when the measured voltage VB2 of the cell B2 reaches the corrected equalization target voltage Vd2', the switch of the discharge circuit connected to the cell B2 is set to OFF and discharging of the cell B2 ends ("g" point shown in FIG. 8). Here, the adjacent cells B1 and B3 are in a discharge stopped state as well as at the time when the discharging of the cell B2 was started (at "b" point shown in FIG. 8). Therefore, the measured voltage VB2 of the cell B2 increases by the amount of voltage drop $\Delta VB2$ caused when the discharging was started, and coincides with the equalization target voltage before correction Vd.

When the discharging of the cell B2 ends, since the discharge current $I_2$ stops flowing in the first current wire 23 shown in FIG. 6, the measured voltage VB1 of the cell B1 decreases by the amount exceeding the equalization target voltage before correction Vd (=$I_2 \cdot RL_2$), thereby coinciding with the equalization target voltage before correction Vd. In the same manner as for the cell B1, the measured voltage VB3 of the cell B3 decreases by the amount exceeding the equalization target voltage before correction Vd (=$I_2 \cdot RL_3$), thereby coinciding with the equalization target voltage before correction Vd.

In the state of charge equalizing device of this embodiment, the discharging of the cells having an open-circuit voltage higher than the equalization target voltage Vd is started in descending order starting with the cell having the highest open-circuit voltage. Also, every time discharging of a cell is started, the corrected equalization target voltage for the cell is calculated, whereby the voltage of each cell can coincide with the equalization target voltage before correction Vd. Thus, the equalization process can be performed with higher accuracy than in the first embodiment.

In addition, in the embodiments above, as a method of calculating the equalization target voltage, the device adopts the method of identifying the lowest cell voltage from the cell voltages of the plurality of cells that form an assembled battery to calculate the equalization target voltage from the cell voltage. However, the method is not limited to that in the foregoing embodiments and it is also possible to adopt various known methods, for example the method of calculating the equalization target voltage based on the average value of the cell voltages.

Further, in the embodiments described above, the equalization process is performed only by discharging cells, however, it is also possible to adopt a structure in which the equalization process is performed only by charging cells and a structure in which the equalization process is performed by both discharging and charging cells. In the second embodiment, the switches of the discharge circuits are set to ON in descending order in the open-circuit voltage of the cells starting with the cell having the highest open-circuit voltage, however, in the structure in which the equalization process is performed only by charging, the switches of the discharge circuits are set to ON in ascending order in the open-circuit voltage of the cell starting with the cell having the lowest open-circuit voltage, thereby realizing higher accuracy in the equalization process.

In the state of charge equalizing device of the first embodiment, after the switches of all the discharge circuits connected to the cells which need to be discharged are set to ON, the equalization target voltage is corrected, however, it is also possible to adopt the structure in which the equalization target voltage is corrected every time the switch of a discharge circuit is set to ON.

Further, in order to prevent an abnormal heat generation or the like in the circuit element in the case where the short circuit is caused by an accident in a connecting wire connecting the cell and the discharge circuit to each other, it is possible to adopt the structure in which a connecting wire having a relatively high resistance component is adopted as the connecting wire, and the structure in which a resistor is interposed in the connecting wire. And in those structures, the equalization process can be performed with high accuracy according to the present invention.

Still further, in the embodiments described above, the equalization process is performed when the ignition switch is set to OFF, however, it is also possible to adopt the structure in which the equalization process is performed when the ignition switch is ON and a cell is not charged or discharged, i.e. when driving with only engine.

What is claimed is:

1. A state of charge equalizing device equalizing the state of charge of each cell of a plurality of cells connected to each other in series to form an assembled battery, comprising: a plurality of charging/discharging circuits connected in parallel to the respective cells to discharge and/or charge the respective cells; a plurality of voltage measurement circuits connected to the respective charging/discharging circuits to measure the voltages across the respective cells; and a control circuit controlling an operation of each of the charging/discharging circuits based on the measurement result of each of the voltage measurement circuits, the control circuit comprising:
an equalization target voltage calculating unit calculating an equalization target voltage based on the voltages measured by the plurality of voltage measurement circuits before the plurality of charging/discharging circuits start discharging or charging;
a charging/discharging starting unit that starts discharging or charging the cells each having a voltage thereacross different from the equalization target voltage calculated by the equalization target voltage calculating unit, by means of the respective charging/discharging circuits;
a correcting unit correcting the equalization target voltage to thereby calculate a corrected equalization target voltage for each of said cells based on the difference between the voltage measured by the voltage measurement circuit before the charging/discharging circuit starts discharging or charging the cell and the voltage measured by the voltage measurement circuit after a certain period of time elapses from when the charging/discharging circuit starts discharging or charging the cell; and
a discharging or charging ending unit that ends the discharge or charge of each of said cells by the charging/discharging circuit when the voltage measured by the voltage measurement circuit reaches the corrected equalization target voltage calculated by the correcting unit.

2. The state of charge equalizing device according to claim 1, wherein the certain period of time is set to a period of time which lasts until the voltage across the cell is stabilized and starts changing due to the discharging or charging by the charging/discharging circuit.

3. The state of charge equalizing device according to claim 1, wherein the charging/discharging circuits discharge the respective cells, and the correcting unit calculates the corrected equalization target voltage by subtracting the voltage difference from the equalization target voltage calculated by the equalization target voltage calculating unit.

4. The state of charge equalizing device according to claim 3, wherein the charging/discharging starting unit starts discharging in descending order starting with a cell having the highest voltage among the voltages measured by the plurality of voltage measurement circuits before the charging/discharging circuits start discharging, and the correcting unit calculates the corrected equalization target voltage for each cell every time the discharging of the cell is started.

5. An assembled battery system comprising an assembled battery including a plurality of cells connected to each other in series, and a state of charge equalizing device according to claim 1.

* * * * *